US012567645B2

(12) United States Patent

Jin et al.

(10) Patent No.: US 12,567,645 B2
(45) Date of Patent: Mar. 3, 2026

(54) BATTERY, ELECTRICAL DEVICE, AND METHOD AND DEVICE FOR MANUFACTURING BATTERY

(71) Applicant: CONTEMPORARY AMPEREX TECHNOLOGY (HONG KONG) LIMITED, Hong Kong (CN)

(72) Inventors: Haizu Jin, Ningde (CN); Hu Xu, Ningde (CN); Yuqun Zeng, Ningde (CN); Chengdu Liang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 788 days.

(21) Appl. No.: 17/815,570

(22) Filed: Jul. 28, 2022

(65) Prior Publication Data

US 2022/0367968 A1 Nov. 17, 2022

Related U.S. Application Data

(63) Continuation of application No. PCT/CN2021/076293, filed on Feb. 9, 2021.

(51) Int. Cl.
H01M 50/249 (2021.01)
H01M 50/213 (2021.01)
(Continued)

(52) U.S. Cl.
CPC ..... H01M 50/3425 (2021.01); H01M 50/213 (2021.01); H01M 50/249 (2021.01); H01M 50/375 (2021.01); *H01M 2220/20* (2013.01)

(58) Field of Classification Search
CPC .......... H01M 50/3425; H01M 50/249; H01M 50/213; H01M 50/375; H01M 2220/20
See application file for complete search history.

(56) References Cited

U.S. PATENT DOCUMENTS

| | | | |
|---|---|---|---|
| 7,517,607 | B2 | 4/2009 | Kim |
| 2005/0181272 | A1 | 8/2005 | Kim |

(Continued)

FOREIGN PATENT DOCUMENTS

| | | |
|---|---|---|
| CN | 1610175 A | 4/2005 |
| CN | 205846021 U | 12/2016 |

(Continued)

OTHER PUBLICATIONS

English machine translation of Chen et al (U.S. Pat. No. 210245599 U) (Year: 2020).*

(Continued)

*Primary Examiner* — Brian R Ohara
*Assistant Examiner* — Emily Elizabeth Freeman
(74) *Attorney, Agent, or Firm* — K&L Gates LLP

(57) ABSTRACT

A battery, an electrical device, and a method and device for manufacturing a battery are provides. In some embodiments, the battery includes: a plurality of battery cells arranged along a first direction. Each battery cell includes an end cap and a housing, an opening is made at an end of the housing along the first direction, the end cap is configured to close the opening, and the housing includes a first wall extending along the first direction. A pressure relief region is provided on the first wall. The pressure relief region is configured to release pressure along a second direction when an internal pressure or temperature of the battery cell reaches a threshold. The second direction intersects the first direction. In this way, various embodiments improve safety of the battery.

14 Claims, 8 Drawing Sheets

(51) Int. Cl.
    *H01M 50/342*       (2021.01)
    *H01M 50/375*       (2021.01)

(56)           References Cited

U.S. PATENT DOCUMENTS

| | | | |
|---|---|---|---|
| 2009/0029240 | A1* | 1/2009 | Gardner .............. H01M 50/538 |
| | | | 429/211 |
| 2013/0095353 | A1* | 4/2013 | Li ....................... H01M 50/333 |
| | | | 429/50 |
| 2018/0351177 | A1* | 12/2018 | Kang ....................... C08L 15/00 |
| 2019/0140223 | A1* | 5/2019 | Zeilinger ............ H01M 50/169 |

FOREIGN PATENT DOCUMENTS

| | | | |
|---|---|---|---|
| CN | 210245599 | U | 4/2020 |
| JP | H06333548 | A | 12/1994 |
| JP | H10269997 | A | 10/1998 |
| JP | 2011204726 | A | 10/2011 |
| JP | 2017091609 | A | 5/2017 |

OTHER PUBLICATIONS

First Office Action received in the corresponding Chinese Application 202180008113.4, mailed Feb. 22, 2023.
International Search Report and Written Opinion received in PCT Application PCT/CN2021/076293 on Nov. 10, 2021.

\* cited by examiner

400
—

Provide a plurality of battery cells, where each battery     401
cell includes an end cap and a housing, an opening is
made at an end of the housing along a first direction, the
end cap is configured to close the opening, the housing
includes a first wall extending along the first direction, a
pressure relief region is provided on the first wall, the
pressure relief region is configured to release pressure
along a second direction when an internal pressure or
temperature of the battery cell reaches a threshold, and
the second direction intersects the first direction

402

Arrange the plurality of battery cells along the first
direction

FIG. 17

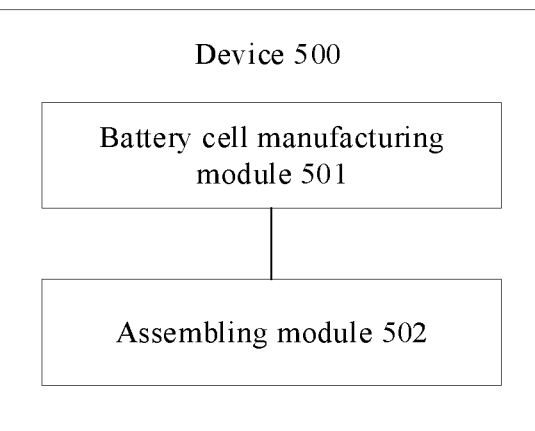

Device 500

Battery cell manufacturing
module 501

Assembling module 502

FIG. 18

BATTERY, ELECTRICAL DEVICE, AND METHOD AND DEVICE FOR MANUFACTURING BATTERY

CROSS-REFERENCE TO RELATED APPLICATIONS

This application is a continuation of International Application PCT/CN2021/076293, filed on Feb. 9, 2021 and entitled "BATTERY, ELECTRICAL DEVICE, AND METHOD AND DEVICE FOR MANUFACTURING BATTERY", which is incorporated herein by reference in its entirety.

TECHNICAL FIELD

This disclosure relates to the technical field of energy storage components, and in particular, to a battery, an electrical device, and a method and device for manufacturing a battery.

BACKGROUND

Lithium batteries are widely used due to advantages such as a small size, a high energy density, a high power density, reusability for many cycles, and a long shelf life. However, when a battery is in abnormal use, for example, when the battery is overcharged or when an abnormal short circuit occurs inside the battery, an internal temperature and pressure is prone to rise, and a housing of the battery is at a risk of cracking or even explosion due to inability to withstand the internal pressure.

To avoid explosion of a conventional battery, a pressure relief region is usually disposed at an end cap of a battery cell. However, in such a practice, a battery in use is usually in the form of a battery module formed by connecting a plurality of battery cells in series, parallel, or series-and-parallel pattern. Therefore, when an internal pressure or temperature of the housing of the battery cell reaches a threshold, the internal pressure released by the battery cell in the pressure relief region is prone to impact another battery cell that is adjacent. The impact is prone to break the other battery cell or even cause a secondary explosion accident, thereby reducing safety and reliability of the battery in use.

SUMMARY

A battery, an electrical device, and a method and device for manufacturing a battery are provided in accordance with some embodiments to improve safety of the battery.

According to a first aspect, a battery is provided, including: a plurality of battery cells arranged along a first direction. Each battery cell includes an end cap and a housing, an opening is made at an end of the housing along the first direction, the end cap is configured to close the opening, and the housing includes a first wall extending along the first direction. A pressure relief region is provided on the first wall. The pressure relief region is configured to release pressure along a second direction when an internal pressure or temperature of the battery cell reaches a threshold. The second direction intersects the first direction.

In the battery according to embodiments, a plurality of battery cells are arranged along the first direction. The end cap is mounted at the end of the housing along the first direction. The pressure relief region is provided on the first wall of the housing, the first wall extending along the first direction. The battery cell releases the internal pressure in the pressure relief region when the internal pressure or temperature in the housing of the battery cell reaches the threshold. The internal pressure can be released outward along the second direction intersecting the first direction. In this way, the pressure released from the pressure relief region will not impact an adjacent battery cell or damage other battery cells, thereby improving the safety of the battery.

In some embodiments, the pressure relief region of the first wall includes a fragile portion. The pressure relief region is configured to break the fragile portion to release the pressure when the internal pressure or temperature of the battery cell reaches the threshold.

In some embodiments, the fragile portion is formed on the first wall by making a first groove in the pressure relief region. A thickness of the fragile portion is less than a thickness of a remaining part of the first wall.

In this structure in which the fragile portion is formed by making the first groove in the pressure relief region, the first groove can be formed in the pressure relief region of the first wall by stamping, milling, laser engraving, and other processing methods. The structure is simple, and the processing is convenient, thereby helping to reduce the manufacturing cost.

In some embodiments, the first groove is made on an outer surface of the housing, and/or the first groove is made on an inner surface of the housing.

Due to the limited space inside the housing of the battery cell, by making the first groove on the outer surface of the first wall, it is convenient to process and form the first groove, and the processing is facilitated. By making the first groove on the inner surface of the first wall, the first groove is prevented from being exposed outside the housing, thereby improving visual appearance of the battery cell. By making the first groove on both the inner surface and the outer surface of the first wall, a problem is solved that the existing processing method can hardly achieve a preset processing depth of the first groove when the first groove is made on only the inner surface or only the outer surface of the first wall.

In some embodiments, the battery cell is a cylindrical structure, and a bottom side of the first groove is a curved face, or a bottom side of the first groove is a flat face.

For a battery cell with a cylindrical structure, when the bottom side of the first groove is a curved face parallel to the inner surface and/or the outer surface of the first wall, the thickness of the fragile portion is equalized at all positions, and the structural strength of the fragile portion is relatively consistent. When the internal pressure or temperature of the battery cell reaches the threshold, the internal pressure can be evenly released from all positions of the fragile portion. When the bottom side of the first groove is a flat face, the structure is conveniently processible, and the thickness of the fragile portion gradually decreases from flanks to center in the width direction. When the battery cell is blasted, the fragile portion is ruptured at a thinnest position. The structural strength of the fragile portion is relatively high, and the fragile portion is not prone to rupture under an external force other than the internal pressure or temperature.

In some embodiments, a second groove is made at a bottom side of the first groove. The thickness of the fragile portion at the second groove is less than the thickness of the remaining part of the fragile portion. The pressure relief region is configured to break a bottom side of the second groove to release the pressure when the internal pressure or temperature of the battery cell reaches the threshold.

By making a first groove in the pressure relief region first and then making a second groove on the bottom side of the first groove, with the first groove and the second groove being deepened gradually in the pressure relief region, the problem of being difficult to achieve the preset processing depth of the second groove in existing processing technology is solved, and the processing is facilitated. In addition, the thickness of the fragile portion at the second groove is less than the thickness of the remaining part of the fragile portion. Therefore, the structural strength of the fragile portion is high, and the battery cell is blasted at the bottom side of the second groove, thereby achieving an effect of directional blasting.

In some embodiments, the first wall includes a through-hole extending along the second direction and a pressure relief sheet covering the through-hole. The fragile portion is disposed on the pressure relief sheet.

In this way, the fragile portion may be processed and formed on the pressure relief sheet first, and then mounted on the first wall through the pressure relief sheet. The structural processing and design of the fragile portion are not prone to be affected by the shape of the housing of the battery cell, thereby helping to reduce the difficulty of processing and manufacturing the fragile portion.

In some embodiments, the first wall further includes a body portion, and the body portion and the fragile portion are integrally formed.

In some embodiments, the first groove extends along the first direction. A ratio of a dimension of the first groove in the first direction to a dimension of the first wall in the first direction is greater than $\frac{1}{3}$.

The gas inside the battery cell generally concentrates at a position close to two ends along the first direction. If the ratio of the dimension of the first groove in the first direction to the dimension of the first wall in the first direction is greater, the fragile portion formed by making the first groove in the pressure relief region is closer to positions at the two ends of the battery cell along the first direction. This effectively shortens a pressure relief path of the gas inside the battery cell, so that the battery cell can release pressure quickly in time when the internal temperature or pressure of the battery cell reaches the threshold.

In some embodiments, the first groove is an annular structure.

With the first groove made in an annular shape, when the internal pressure or temperature of the battery cell reaches the threshold, the area of releasing pressure outward from the battery cell is increased, so that the internal pressure of the battery cell can be released quickly to avoid violent explosion, thereby improving the safety of the battery cell.

In some embodiments, the first groove is disposed around a central axis of the battery cell, the central axis being parallel to the first direction.

In other words, the fragile portion is disposed as a circle around the central axis of the battery cell, the central axis being parallel to the first direction. When the fragile portion is broken, the battery cell can release pressure outward from all positions surrounded by the fragile portion, thereby helping to shorten the path of gas exhausting and pressure release and improve the pressure release efficiency.

In some embodiments, the first groove includes a first part and a second part that are in communication with each other. The fragile portion includes a first fragile portion formed by disposing the first part and a second fragile portion formed by disposing the second part. A thickness of the first fragile portion is less than a thickness of the second fragile portion. The pressure relief region is configured to break the first fragile portion and avoid breaking at least a part of the second fragile portion when the internal pressure or temperature of the battery cell reaches the threshold.

In this way, when the internal pressure of the battery cell reaches the threshold, the first fragile portion is broken, but at least a part of the second fragile portion remains unbroken, thereby avoiding flying debris generated by the housing when the fragile portion is completely broken, and ensuring the safety of the battery cell.

In some embodiments, the first wall includes two fragile portions spaced apart along the first direction in the pressure relief region.

By disposing two fragile portions, when the internal pressure or temperature of the battery cell reaches the threshold, the area of releasing pressure is increased in the pressure relief region, the pressure relief capability of the battery cell is improved, and the safety of the battery is further improved.

In some embodiments, a spacing between two fragile portions along the first direction is set based on a capacity of the battery cell.

In some embodiments, the housing further includes a second wall. The second wall and the end cap are connected to two ends of the first wall respectively, the two ends being opposite to each other along the first direction. The battery cell further includes an electrode assembly. After being wound, the electrode assembly includes a first end face contiguous to the end cap and a second end face contiguous to the second wall in the first direction.

In some embodiments, at least a part of the pressure relief region is a region located between the first end face and the end cap along the first direction on the first wall.

Generally, the gas inside the battery cell is prone to concentrate at the two ends of the electrode assembly. Therefore, by disposing at least a part of the pressure relief region in the area that is on the first wall and between the first end face of the electrode assembly and the end cap, such embodiments can reduce the paths for releasing outward the pressure that is generated by the gas located between the end cap and the electrode terminal.

In some embodiments, at least a part of the pressure relief region is a region located between the second end face and the second wall along the first direction on the first wall.

Generally, the gas inside the battery cell is prone to concentrate at the two ends of the electrode assembly. Therefore, by disposing at least a part of the pressure relief region in the area that is on the first wall and between the second end face of the electrode assembly and the second wall, such embodiments can reduce the paths for releasing outward the pressure that is generated by the gas located between the second wall and the second end face of the electrode terminal.

According to a second aspect of this application, an electrical device is provided, including the battery described above. The battery is configured to provide electrical energy.

According to a third aspect of this application, a method for manufacturing a battery is provided, including: providing a plurality of battery cells, where each battery cell includes an end cap and a housing, an opening is made at an end of the housing along a first direction, the end cap is configured to close the opening, the housing includes a first wall extending along the first direction, a pressure relief region is provided on the first wall, the pressure relief region is configured to release pressure along a second direction when an internal pressure or temperature of the battery cell reaches a threshold, and the second direction intersects the first direction; and arranging the plurality of battery cells along the first direction.

In this method, a plurality of battery cells are arranged along the first direction. The end cap is mounted at the end of the housing along the first direction. The pressure relief region is provided on the first wall of the housing, the first wall extending along the first direction. The battery cell releases the internal pressure in the pressure relief region when the internal pressure or temperature in the housing of the battery cell reaches the threshold. The internal pressure can be released outward along the second direction intersecting the first direction. In this way, the pressure released from the pressure relief region will not impact an adjacent battery cell or damage other battery cells, thereby improving the safety of the battery.

According to a fourth aspect, a device for manufacturing a battery is provided, including: a battery cell manufacturing module, configured to manufacture battery cells, where each battery cell includes: an end cap and a housing, an opening is made at an end of the housing along a first direction, the end cap is configured to close the opening, the housing includes a first wall extending along the first direction, a pressure relief region is provided on the first wall, the pressure relief region is configured to release pressure along a second direction when an internal pressure or temperature of the battery cell reaches a threshold, and the second direction intersects the first direction; and an assembling module, configured to arrange a plurality of battery cells along the first direction.

BRIEF DESCRIPTION OF DRAWINGS

The drawings described herein are intended to enable a further understanding of this application, and constitute a part of this application. The exemplary various embodiments and the description thereof are intended to explain this application but not to constitute any undue limitation on this application. In the drawings:

FIG. 17 is a schematic flowchart of a method for manufacturing a battery according to one embodiment; and FIG. 18 is a schematic structural block diagram of a device for manufacturing a battery according to one embodiment.

Figure 1:
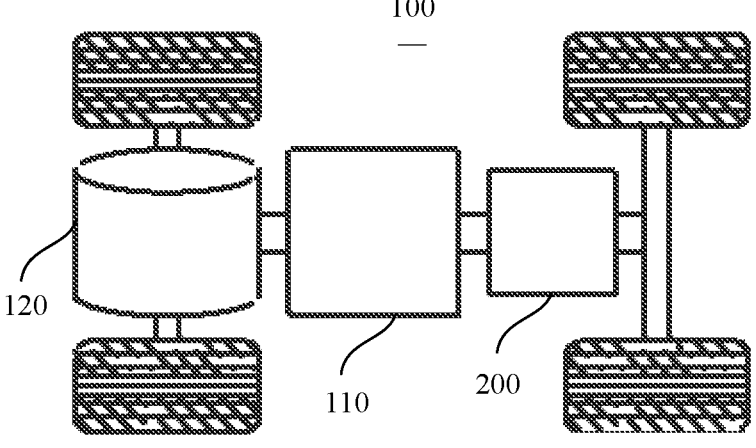
FIG. 1 is a schematic structural diagram of a vehicle according to one embodiment.

The drawings are not drawn to scale.

DETAILED DESCRIPTION OF EMBODIMENTS

Reference Numerals

100. vehicle; 110. controller; 120. motor;

200. battery; 210. first cover portion; 220. second cover portion; 230. busbar component;

300. battery cell;

310. electrode assembly; 311. first end face; 312. second end face;

320. end cap;

330. housing; 331. fragile portion; 331a. first fragile portion; 331b. second fragile portion;

332. first groove; 332a. first part; 332b. second part; 3321. second groove; 333. through-hole;

340. pressure relief sheet; and

350. pressure relief position.

To make the objectives, technical solutions, and advantages of the various embodiments clearer, the following gives a clear and thorough description of the technical solutions in the various embodiments with reference to the drawings in the various embodiments. Apparently, the described embodiments are merely a part of but not all of the various embodiments. All other embodiments derived by a person of ordinary skill in the art based on the various embodiments without making any creative efforts fall within the protection scope of this application.

Unless otherwise defined, all technical and scientific terms used herein have the same meanings as usually understood by a person skilled in the technical field of this application. The terms used in the specification of this application are merely intended for describing specific embodiments but are not intended to limit this application. The terms "include" and "contain" and any variations thereof used in the specification, claims, and brief description of drawings of this application are intended as non-exclusive inclusion. The terms such as "first" and "second" used in the specification, claims, and brief description of drawings herein are intended to distinguish between different items, but are not intended to describe a specific sequence or order of precedence.

Reference to "embodiment" herein means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described herein may be combined with other embodiments.

The term "and/or" herein merely indicates a relationship between related items, and represents three possible relationships. For example, "A and/or B" may represent the following three circumstances: A alone, both A and B, and B alone. In addition, the character "/" herein generally indicates an "or" relationship between the item preceding the character and the item following the character.

"A plurality of" referred to in this application means two or more (including two). Similarly, "a plurality of groups"

means two or more groups (including two groups), and "a plurality of pieces" means two or more pieces (including two pieces).

A battery cell and a battery including a plurality of battery cells according to various embodiments are applicable to various devices that use a battery as a power supply, for example, a mobile phone, a portable device, a notebook computer, an electric power cart, an electric vehicle, a ship, a spacecraft, an electric toy, an electric tool. The spacecraft may include an airplane, a rocket, a space shuttle, a spaceship, and the like. The electric toy may include a fixed or mobile electric toy, such as a game console, an electric car toy, an electric ship toy, an electric airplane toy, and the like. The electric tool may include an electric tool for metal cutting, an electric grinding tool, an electric assembly tool, an electric tool for railways, such as an electric drill, an electric grinder, an electric wrench, an electric screwdriver, an electric hammer, an electric impact drill, a concrete vibrator, an electric planer, and the like.

The battery cell and the battery including a plurality of battery cells according to various embodiments are not only applicable to the devices described above, but also applicable to all battery-powered devices. However, for brevity, the following embodiments are described by using a vehicle 100 as an example.

Referring to FIG. 1, FIG. 1 is a schematic structural diagram of a vehicle 100 according to one embodiment. The vehicle 100 may be an oil-fueled vehicle, a natural gas vehicle, or a new energy vehicle. The new energy vehicle may be a battery electric vehicle, a hybrid electric vehicle, a range-extended electric vehicle, or the like. A battery 200 may be disposed inside the vehicle 100. The battery 200 may be a battery pack or a battery module. For example, the battery 200 may be disposed at the bottom, front, or rear of the vehicle 100. The controller 110 and the motor 120 may be further disposed inside the vehicle 100. The controller 110 may be configured to control the battery 200 to supply power to the motor 120. Through a transmission mechanism, the motor 120 may drive wheels of the vehicle 100 to run. The battery 200 may be configured to supply power to the vehicle 100. For example, the battery 200 may serve as an operating power supply of the vehicle 100 to power a circuit system of the vehicle 100. Alternatively, the battery may be configured to meet operating power usage requirements of the vehicle 100 that is being started or navigated or running. In another embodiment of this application, the battery 200 serves not only as an operating power supply of the vehicle 100, but may also serve as a drive power supply of the vehicle 100 to provide driving motive power for the vehicle 100 in place of or partially in place of oil or natural gas.

Figure 2:
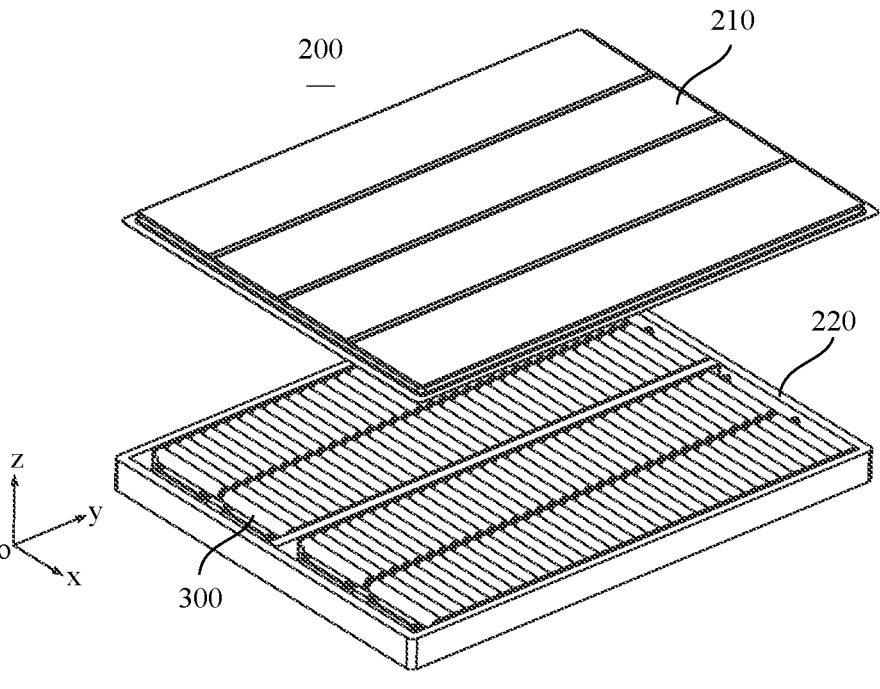
FIG. 2 is a schematic structural exploded view of a battery according to one embodiment.

Referring to FIG. 2, FIG. 2 is a schematic structural exploded view of a battery 200 according to one embodiment. To meet different power usage requirements, the battery 200 may include one or more battery cells 300. The plurality of battery cells 300 may be connected in series, parallel, or series-and-parallel pattern. The series-and-parallel pattern means a combination of series connection and parallel connection. Alternatively, the plurality of battery cells 300 may be connected in series, parallel, or series-and-parallel pattern to form a battery module (or referred to as a battery group) first, and then a plurality of battery modules may be connected in series, parallel, or series-and-parallel pattern to form the battery 200. In other words, the battery 200 may be directly formed of a plurality of battery cells 300, or the battery cells may form a battery module first and then a plurality of battery modules form the battery 200.

In the embodiment shown in FIG. 2, the battery 200 includes a plurality of battery cells 300. The battery 200 further includes a box. The interior of the box is a hollow structure. A plurality of battery cells 300 are accommodated in the box. The box may further include a first cover portion 210 and a second cover portion 220. The first cover portion 210 and the second cover portion 220 are snap-fitted together. The plurality of battery cells 300 are connected in series, parallel, or series-and-parallel pattern, and then placed in an accommodation space formed by snap-fitting the first cover portion 210 and the second cover portion 220. The plurality of battery cells 300 may be placed in the box horizontally or vertically. As an example in this application, a plurality of battery cells 300 are placed in the box horizontally.

Figure 3:
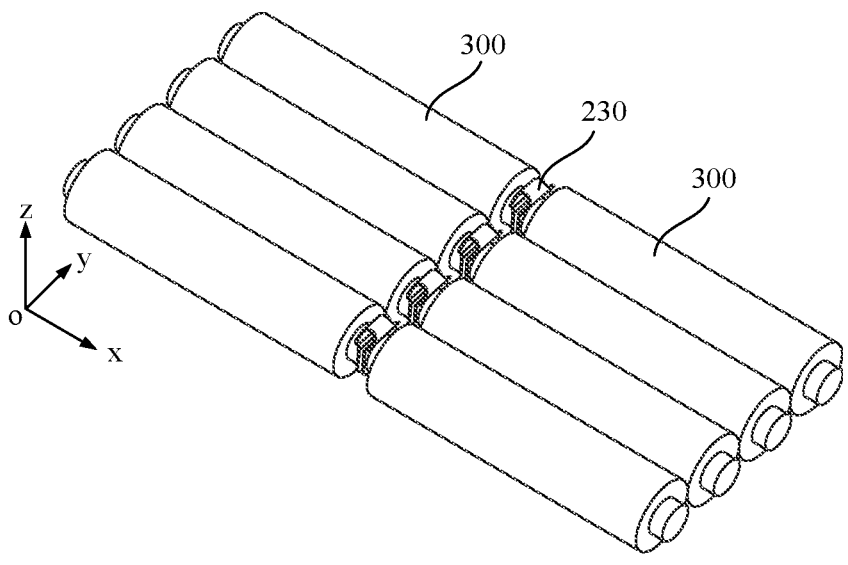
FIG. 3 is a schematic structural diagram of connection between battery cells according to one embodiment.

In some embodiments, referring to FIG. 3, FIG. 3 is a schematic diagram of a connection structure between one battery cell 300 and another battery cell 300 in a battery 200 according to one embodiment. The battery 200 may further include other structures. For example, the battery 200 may further include a busbar component 230 configured to implement electrical connection between the plurality of battery cells 300.

The battery cell 300 may be in a cylindrical shape, a flat shape, a cuboidal shape, or other shapes. As an example in this application, the battery cell 300 is a cylinder.

Figure 4:
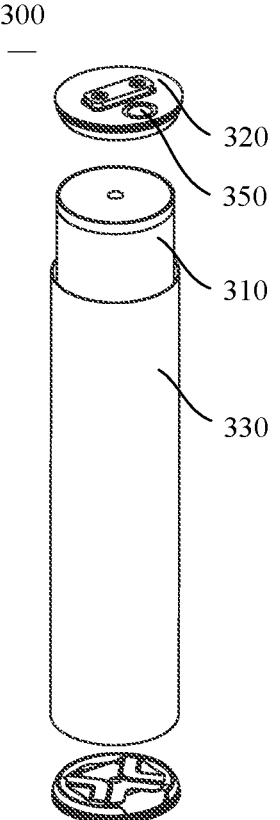
FIG. 4 is a schematic structural exploded view of an existing battery cell.

As shown in FIG. 4, FIG. 4 is a schematic structural exploded view of an existing battery cell 300. An electrode assembly 310 and an electrolytic solution are disposed in the battery cell 300. The electrode assembly 310 may be formed by stacking or winding a positive electrode plate, a negative electrode plate, and a separator together. The battery cell 300 works primarily by the movement of metal ions in the electrolytic solution between the positive electrode plate and the negative electrode plate. The separator is an insulator located between the positive electrode plate and the negative electrode plate. The positive electrode plate and the negative electrode plate each include a coated region and an uncoated region. A positive active material is coated on the coated region of the positive electrode plate, and a negative active material is coated on the coated region of the negative electrode plate. The active materials are coated on a current collector formed of a metal sheet. No active material is coated on the uncoated region. To be specific, the positive electrode plate includes a positive current collector and a positive active material layer. The positive active material layer is coated on a surface of the positive current collector. A part that is of the current collector and that is not coated with the positive active material layer protrudes from a part that is of the current collector and that is coated with the positive active material layer. The part that is of the current collector and that is not coated with the positive active material layer serves as a positive tab. The negative electrode plate includes a negative current collector and a negative active material layer. The negative active material layer is coated on a surface of the negative current collector. A part that is of the current collector and that is not coated with the negative active material layer protrudes from a part that is of the current collector and that is coated with the negative active material layer. The part that is of the current collector and that is not coated with the negative active material layer serves as a negative tab.

The battery cell 300 further includes an end cap 320 and a housing 330. An opening is made on the housing 330. An inner space in communication with the opening is provided in the housing 330. The inner space may be configured to accommodate the electrode assembly 310 and the electrolytic solution. The end cap 320 fits onto the opening of the housing 330 to seal the electrode assembly 310 and the electrolytic solution in the housing 330. An electrode terminal is disposed on the end cap 320. The electrode terminal is electrically connected to a positive tab or a negative tab in the electrode assembly 310 by a connector adapter.

Still referring to FIG. 4, in order to improve safety of the battery 200, a pressure relief position 350 is usually disposed on the battery cell 300. The pressure relief position 350 is a pressure relief region actuated to relieve the internal pressure or temperature when the internal pressure or temperature of the battery cell 300 reaches a preset threshold, and is also referred to as a pressure relief region. The pressure relief region may be in the form of an explosion-proof valve, a gas valve, a pressure relief valve, a safety valve, or the like, and may specifically adopt a pressure-sensitive or temperature-sensitive element or structure. To be specific, when the internal pressure or temperature of the battery cell 300 reaches the preset threshold, the pressure relief region is actuated or a fragile structure disposed in the pressure relief region is broken to form an opening or channel for relieving the internal pressure or temperature.

Currently, the pressure relief region of the battery cell 300 is usually disposed on the end cap 320. That is, both the pressure relief region and the electrode terminal are located on the end cap 320. For a battery 200 in use, a plurality of battery cells 300 are usually connected in series, parallel, or series-and-parallel pattern to form a battery module, and one battery cell 300 is usually connected to another battery cell 300 in an end-to-end opposition way. The pressure relief region is ruptured when thermal runaway occurs due to overcharge or abnormal short circuit inside the battery cell 300. During the release of the internal pressure of the battery cell 300, another battery cell 300 that is adjacent is prone to be impacted. The impact causes the other battery cell 300 to break, or even results in a secondary explosion accident, thereby reducing the safety and reliability of the battery 200 in use.

To solve the foregoing problem and improve the safety of the battery cell 300, this application optimizes the structure and position of the pressure relief region.

Figure 5:
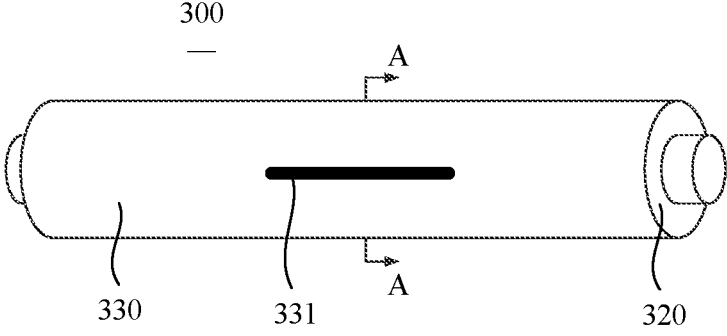
FIG. 5 is a schematic structural diagram of a battery cell according to some various embodiments.

In some embodiments, referring to FIG. 2, FIG. 3, and FIG. 5, FIG. 5 is a schematic structural diagram of a battery cell 300 according to some various embodiments. The battery 200 includes a plurality of battery cells 300. The plurality of battery cells 300 are arranged along the first direction. Each battery cell 300 includes an end cap 320 and a housing 330. An opening is made at the end of the housing 330 along the first direction. The end cap 320 is configured to seal the opening. The housing 330 includes a first wall extending in the first direction. A pressure relief region is provided on the first wall. The pressure relief region is configured to release pressure along a second direction when the internal pressure or temperature of the battery cell 300 reaches the threshold. The second direction intersects the first direction.

As an example, the battery cell 300 may be a cylindrical structure, a cuboidal structure, or other structures. That is, the housing 330 of the battery cell 300 may be a cylindrical structure, or a cuboidal structure, or other structures.

The first direction may be a length direction of the battery cell 300 (the X-axis direction in the drawing).

Understandably, the number of openings of the housing 330 may be one or two. As an example, the opening is made at both ends of the housing 330 along the length direction separately. The number of the end caps 320 is also two. One of the two end caps 320 fits onto the opening at one end of the housing 330. The other fits onto the opening at the other end of the housing 330. In other embodiments, alternatively, the opening is made at one of two ends of the housing 330 along the length direction, but not made at the other end. The end cap 320 fits onto the opened end of the housing 330.

As an example, for a cylinder-structured battery cell 300, the first wall may be a cylindrical surface of the cylindrical housing 330. For a cuboid-structured battery cell 300, the first wall may be at least one of four sidewalls of the cuboidal housing 330. Understandably, the first wall may be parallel to the first direction, or may be at a preset angle to the first direction. Preferably, the first wall is parallel to the first direction. As an example, that the first direction intersects the second direction may be that the first direction is perpendicular to the second direction. Alternatively, the first direction may be at a preset angle such as 45° to the second direction, without being specifically limited herein. For another example, for a cylinder-structured battery cell 300, the second direction may be a radial direction of the battery cell 300.

In the battery 200 according to this embodiment of this application, a plurality of battery cells 300 are arranged along the first direction. The end cap 320 is mounted at the end of the housing 330 along the first direction. The pressure relief region is provided on the first wall of the housing 330, the first wall being parallel to the first direction. When the internal pressure and temperature of the battery cell 300 reach the threshold due to overcharge or an abnormal short circuit inside the battery cell 300, the internal pressure can be released outward along the second direction that intersects the first direction. In this way, the arrangement direction of the battery cells 300 is different from the pressure release direction of the battery cells 300. Therefore, the pressure released from the pressure relief region will not cause impact or even damage to other adjacent battery cells 300, thereby improving the safety of the battery 200 in use. In addition, conductive materials splattered from the pressure relief region are not likely to be splattered onto the busbar component 230 of the adjacent battery 200, where the busbar component is independently located between the ends and is configured to electrically connect the battery cells 300. This can effectively prevent a second accident caused by a short circuit between the battery cells 300 arising from the conductive materials.

In some embodiments, the first wall includes a fragile portion 331 in the pressure relief region. When the internal pressure or temperature on the pressure relief portion inside the battery cell 300 reaches the threshold, the fragile portion 331 is broken to release the internal pressure of the battery cell 300.

Understandably, in other embodiments, the fragile portion 331 may be formed on the first wall by applying a material in the pressure relief region with a structural strength lower than the structural strength of the body portion of the first wall; or, the fragile portion 332 may be formed by disposing a pressure relief component or a pressure relief mechanism in the pressure relief region, or the like, as long as the internal pressure of the battery cell 300 can be released when the internal temperature or pressure of the battery cell 300 reaches the threshold.

Referring to FIG. 6 to FIG. 9, FIG. 6 to FIG. 9 are schematic structural sectional views of a housing 330 sectioned along an A-A direction according to some various embodiments. The fragile portion 331 is formed on the first wall by making a first groove 332 in the pressure relief region. A thickness h1 of the fragile portion 331 is less than a thickness h0 of a remaining part of the first wall.

The first groove 332 may be a groove of various shapes, such as a linear shape, an X shape, an annular shape, without being limited to the examples. As shown in FIG. 5, the first groove 332 shown in FIG. 5 is a linear structure.

By making the first groove 332 in the pressure relief region in such a way that the thickness h1 at the position of the first groove 332 is less than the thickness h0 of the remaining part of the first wall, the structural strength at the position of the first groove 332 is reduced to form the fragile portion 331. In this structure in which the fragile portion 331 is formed by making the first groove 332 in the pressure relief region, the first groove 332 can be formed in the pressure relief region of the first wall by stamping, milling, laser engraving, and other processing methods. The structure is simple, and the processing is convenient, thereby helping to reduce the manufacturing cost.

Figure 6:
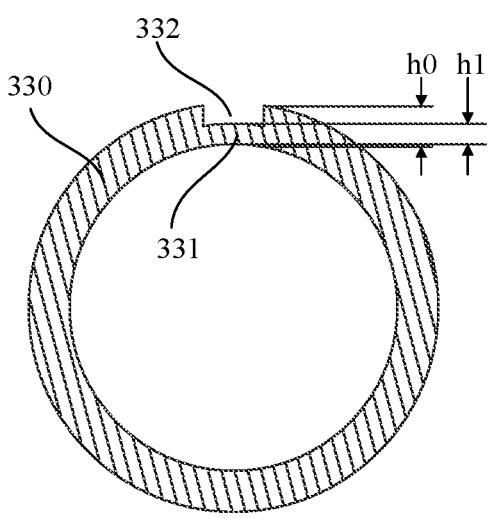
FIG. 6 to FIG. 9 are schematic structural sectional views of a housing sectioned along an A-A direction according to some various embodiments.

In some embodiments, referring to FIG. 6, FIG. 6 is a schematic structural sectional view of a housing 330 sectioned along an A-A direction when the first groove 332 is made on an outer surface of the first wall. The first groove 332 may be made on the outer surface of the first wall, and/or the first groove 332 is made on an inner surface of the housing 330.

As an example, for ease of description, the first groove 332 is in a linear shape and the housing 330 is a cylindrical structure.

In some embodiments, the first groove 332 is made on the outer surface of the first wall. The inner space of the housing 330 of the battery cell 300 is limited, and brings inconvenience to the processing operation of the first groove 332. Therefore, the first groove 332 made on the outer surface of the first wall increases the external space, widens the field of vision, and facilitates visual observation and the processing of the first groove 332.

Figure 7:
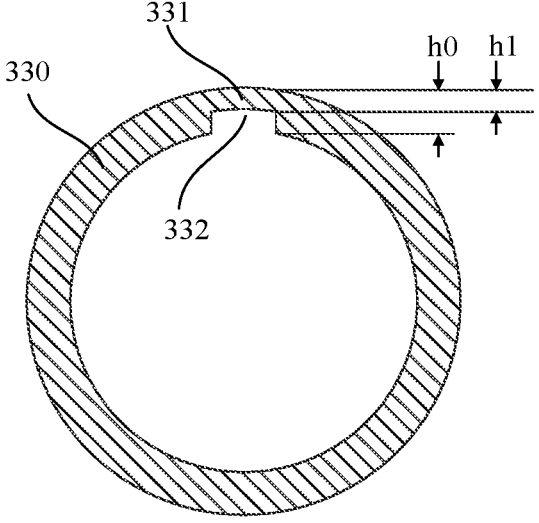

Alternatively, the first groove 332 may be made on the inner surface of the first wall. Referring to FIG. 7, FIG. 7 is a schematic structural sectional view of a housing 330 sectioned along an A-A direction when the first groove 332 is made on the inner surface of the first wall. In this way, the first groove 332 is prevented from being exposed outside the housing 330, thereby improving visual appearance of the battery cell 300.

Figure 8:
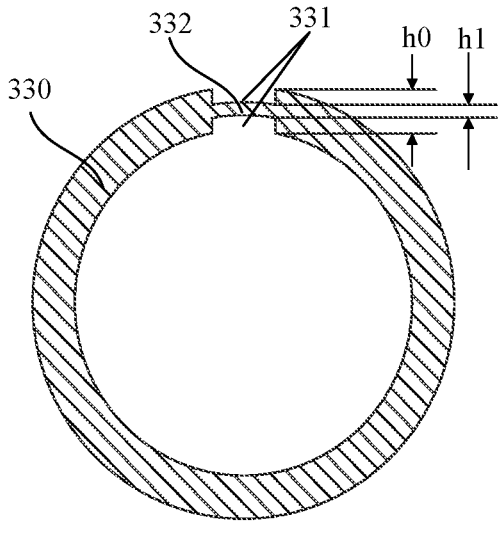

In other embodiments, referring to FIG. 8, FIG. 8 is a schematic structural sectional view of a housing 330 sectioned along an A-A direction when the first groove 332 is made on both the inner surface and the outer surface of the first wall. To solve the problem that the preset processing depth of the first groove 332 can hardly be achieved by the existing processing technology when the first groove 332 is made on only the inner surface of the first wall or only the outer surface of the first wall, the first groove 332 is made on both the inner surface and the outer surface of the first wall. The first groove 332 on the inner surface corresponds to the first groove on the outer surface of the first wall.

In some embodiments, the battery cell 300 is a cylindrical structure, and a bottom side of the first groove 332 is a curved face, or a bottom side of the first groove 332 is a flat face.

The bottom side of the first groove 332 means a wall face perpendicular to the second direction in the first groove 332.

As an example, still referring to FIG. 6 to FIG. 8, FIG. 6 to FIG. 8 are schematic structural sectional views of a housing 330 sectioned along an A-A direction when the bottom wall of the first groove is parallel to the inner surface and/or outer surface of the first wall. For a cylindrical battery cell 300, due to a cylindrical structure of the housing 330, when the bottom side of the first groove 332 is a curved face parallel to the inner surface or the outer surface of the first wall, the thickness of the fragile portion 331 is equalized at all positions, and the structural strength of the fragile portion 331 is relatively consistent. When the internal pressure or temperature of the battery cell 300 reaches the threshold, the internal pressure can be evenly released from all positions of the fragile portion 331. Understandably, in other embodiments, the bottom side of the first groove 332 may be a curved face that is not parallel to the outer surface or the inner surface of the first wall.

Figure 9:
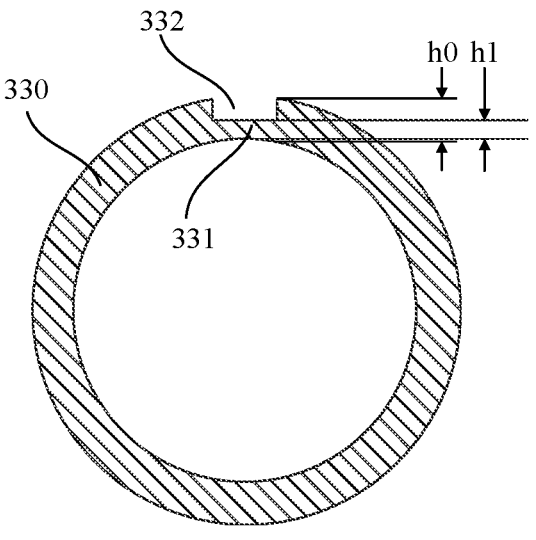

In other embodiments, referring to FIG. 9, FIG. 9 is a schematic structural sectional view of a housing 330 sectioned along an A-A direction when the bottom side of the first groove 332 is a flat face. The bottom side of the first groove 332 may be a flat face instead. The first groove 332 with this structure is conveniently processible. The thickness of the fragile portion 331 gradually decreases from flanks to center in the width direction. When the internal pressure or temperature of the battery cell 300 reaches the threshold, the fragile portion 331 is ruptured at a thinnest position. The structural strength of the fragile portion 331 with this structure is relatively high, and the fragile portion 331 is not prone to rupture under an external force other than the internal pressure or temperature.

It needs to be noted that the structure in which the bottom side of the first groove 332 is a curved face or a flat face is not only applicable to the battery cell 300 with a cylindrical structure, but also applicable to the battery cell 300 with a cuboidal structure or other structures.

Figure 10:
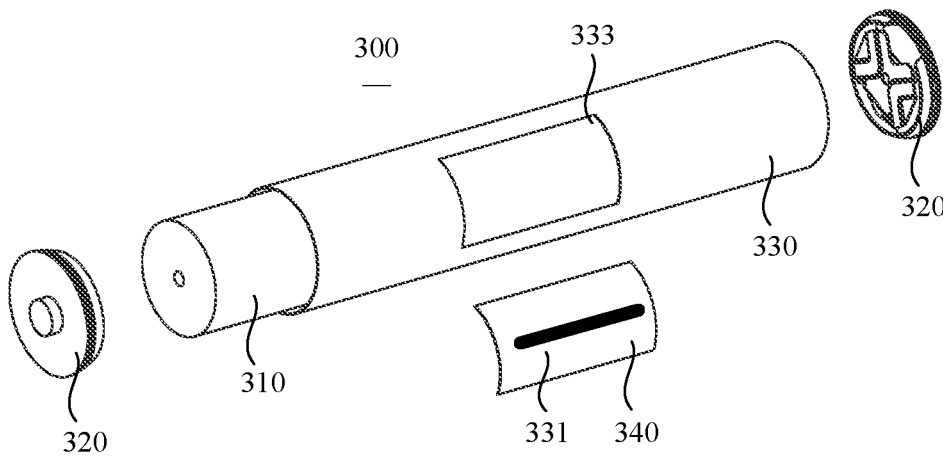
FIG. 10 is a schematic structural diagram of a battery cell according to other various embodiments.
Figure 11:
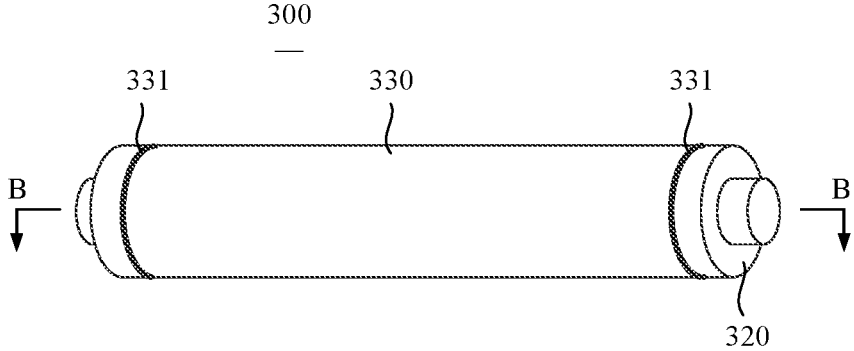
FIG. 11 is a schematic structural exploded view of a battery cell according to some various embodiments.
Figure 12:
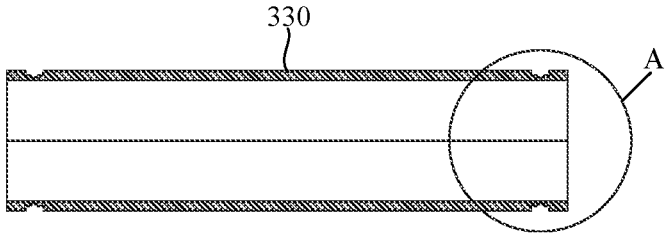
FIG. 12 is schematic structural sectional view of a housing sectioned along a B-B direction according to other various embodiments.

In some embodiments, referring to FIG. 10, FIG. 10 is a schematic structural exploded view of a battery cell 300 according to some various embodiments. The first wall includes a through-hole 333 extending along the first direction and a pressure relief sheet 340 covering the through-hole 333. The fragile portion 331 is disposed on the pressure relief sheet 340.

The pressure relief sheet 340 fits onto the through-hole 333 of the first wall to seal the through-hole 333. As an example, the pressure relief sheet 340 may be fixed onto the first wall by welding such as laser welding, ultrasonic welding, or the like.

In this embodiment, the fragile portion 331 may be processed and formed on the pressure relief sheet 340 first, and then mounted on the first wall through the pressure relief sheet 340. The structural processing and design of the fragile portion 331 are not prone to be affected by the shape of the housing 330 of the battery cell 300, thereby helping to reduce the difficulty of processing and manufacturing the fragile portion 331.

In other embodiments, the first wall further includes a body portion. The body portion and the fragile portion 331 are integrally formed. In other words, the fragile portion 331 and the first wall are an integrated structure.

In some embodiments, the first groove 332 extends along the first direction. A ratio of a dimension of the first groove 332 in the first direction to a dimension of the first wall in the first direction is greater than ⅓.

As an example, still using an example in which the first groove 332 is in a linear shape, the ratio of the length of the first groove 332 in the first direction to the length of the first wall in the first direction is ⅓.

The gas pressure inside the battery cell 300 generally concentrates at a position close to two ends along the first direction. If the ratio of the dimension of the first groove 332 in the first direction to the dimension of the first wall in the first direction is greater, the fragile portion 331 formed by making the first groove 332 in the pressure relief region is closer to positions at the two ends of the battery cell 300 along the first direction. This effectively shortens a pressure relief path of the gas inside the battery cell 300, so that the battery cell 300 can release pressure quickly in time when the internal temperature or pressure of the battery cell 300 reaches the threshold.

In some embodiments, the first groove 332 is made in an annular shape. With the first groove 332 made in an annular shape, when the internal pressure or temperature of the battery cell 300 reaches the threshold, the housing 330 of the battery cell 300 can rupture along an annular edge, thereby increasing the area of releasing pressure outward from the battery cell 300. In this way, the internal pressure of the battery cell 300 can be released outward quickly in time, thereby improving the safety of the battery cell 300.

It should be noted that the first groove 332 may be in a regular annular shape, or in other irregular quasi-annular shapes.

In various embodiments, the first groove 332 is disposed around a central axis of the battery cell 300, the central axis being parallel to the first direction.

In other words, the fragile portion 331 is disposed as a circle around the central axis of the battery cell 300, the central axis being parallel to the first direction. When the fragile portion is broken, the battery cell 300 can release pressure outward from all positions surrounded by the fragile portion 331, thereby helping to shorten the path of gas exhausting and pressure release from inside to outside of the battery cell 300 and improve the pressure release efficiency.

In other embodiments, the central axis of the annular shape may intersect, for example, be perpendicular to, the first direction.

The first groove 332 may be made on the inner surface of the first wall, or the outer surface of the first wall, or both the inner surface and the outer surface of the first wall. Therefore, for ease of description, as an example in the following embodiments, the first groove 332 is an annular shape and is made on the outer surface of the first wall.

Figure 13:
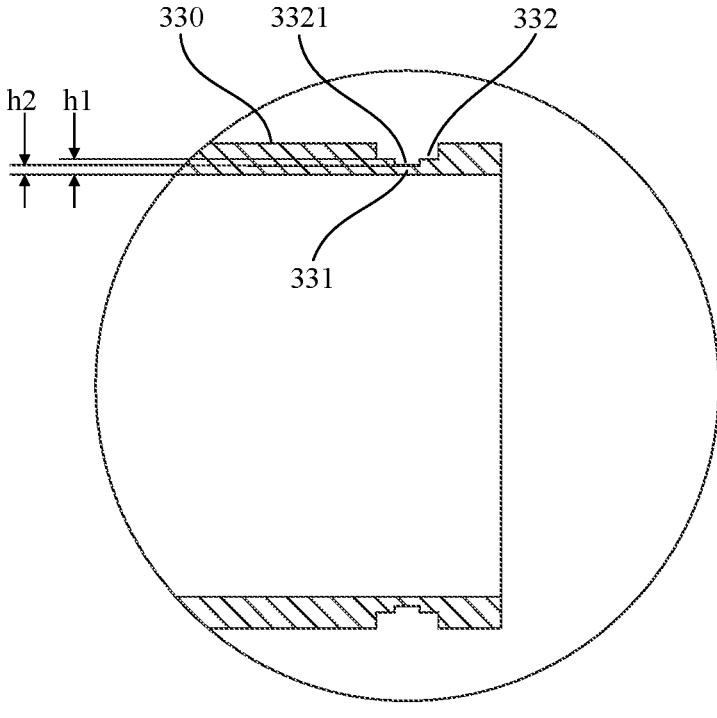
FIG. 13 to FIG. 15 are an enlarged view of position A shown in FIG. 12 according to other various embodiments.

In some embodiments, as shown in FIG. 13, a second groove 3321 is further made at a bottom wall of the first groove 332. The thickness h2 of the fragile portion 331 at the second groove 3321 is less than the thickness h1 of the remaining part of the fragile portion 331. The pressure relief region is configured to break a bottom wall of the second groove 3321 to release the pressure when the internal pressure or temperature of the battery cell 300 reaches the threshold.

By making a first groove 332 in the pressure relief region first and then making a second groove 3321 on the bottom side of the first groove 332, with the first groove 332 and the second groove 3321 being deepened gradually in the pressure relief region, the problem of being difficult to achieve the preset processing depth of the second groove 3321 in existing processing technology is solved, and the processing is facilitated. In addition, the thickness h2 of the fragile portion 331 at the second groove 3321 is less than the thickness h1 of the remaining part of the fragile portion. Therefore, the structural strength of the fragile portion 331 is high, and the battery cell 300 is blasted at the bottom side of the second groove 3321 when the internal pressure or temperature of the battery cell reaches the threshold, thereby achieving an effect of directional blasting.

In some embodiments, the dimension of the second groove 3321 on the bottom side of the first groove 332 in the first direction may be less than or equal to the dimension of the first groove 332 in the first direction, without being specifically limited herein.

Figure 14:
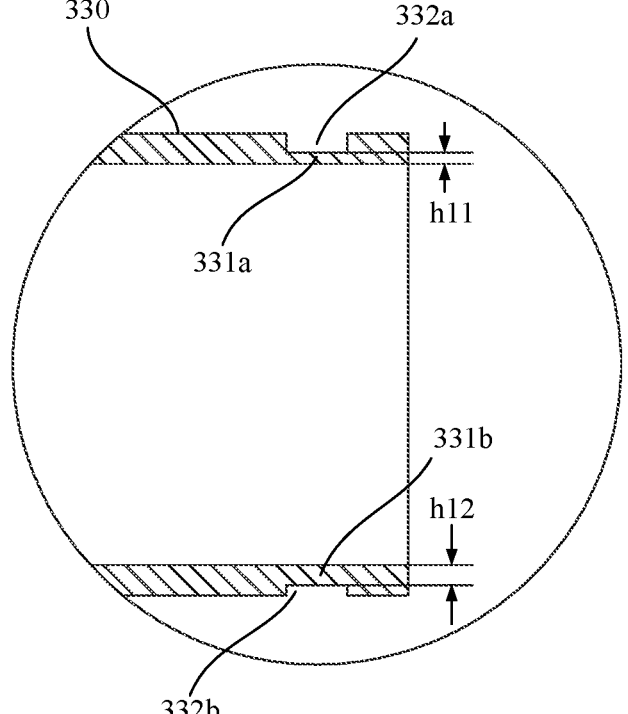

As shown in FIG. 14, in some various embodiments, the first groove 332 includes a first part 332a and a second part 332b. The first part 332a is in communication with the second part 332b. The fragile portion 331 includes a first fragile portion 331a and a second fragile portion 331b. The first fragile portion 331a formed by disposing the first part 332a in the pressure relief region, and the second fragile portion 331b is formed by disposing the second part 332b in the pressure relief region. A thickness h11 of the first fragile portion 331a is less than a thickness h12 of the second fragile portion 331b. The pressure relief region is configured to break the first fragile portion 331a and avoid breaking at least a part of the second fragile portion 331b when the internal pressure or temperature of the battery cell 300 reaches the threshold.

As an example, the first part 332a and the second part 332b may each account for a percentage of the first groove 332, such as ½ of the first groove 332. For example, the first groove 332 is disposed in an annular shape. When a central angle corresponding to an arc length of the first part 332a is 180° and a central angle corresponding to an arc length of the second part 332b is 180°, the corresponding first part and second part each account for ½ of the length of the first groove.

Understandably, the allocation may be performed according to actual conditions. For example, the first part 332a accounts for ⅔ of the first groove 332, and the second part 332b accounts for ⅓ of the first groove 332.

In this way, when the internal pressure or temperature of the battery cell 300 reaches the threshold, the first fragile portion 331a is broken, but at least a part of the second fragile portion 331b remains unbroken, thereby avoiding flying debris generated by the housing when the fragile portion 331 is completely broken, and ensuring the safety of the battery cell.

Figure 15:
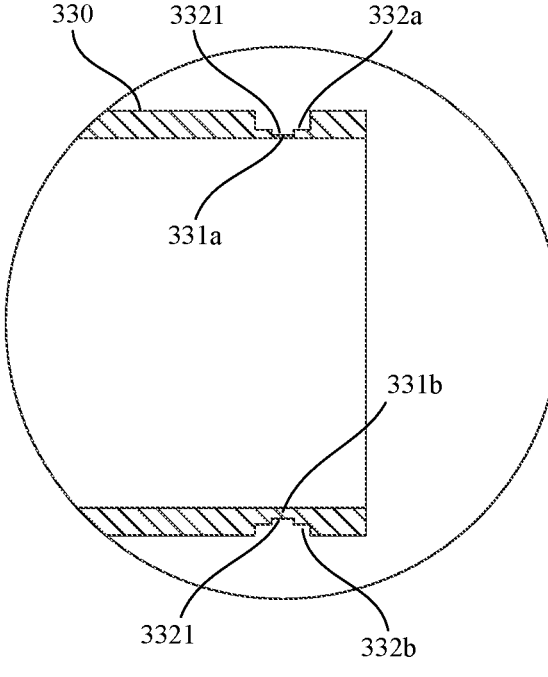

As shown in FIG. 15, in some embodiments, one part of the second groove 332 is made on the bottom wall of the first part 332a, and the other part of the second groove 332 is made on the bottom wall of the second part 332b.

In some various embodiments, the first wall includes two fragile portions 331 in the pressure relief region. The two fragile portions 331 are spaced apart along the first direction. By disposing two fragile portions 331, when the internal pressure or temperature of the battery cell 300 reaches the threshold, the area of releasing pressure is increased in the pressure relief region, the pressure relief capability of the battery cell 300 is improved, and the safety of the battery 200 is further improved.

In some embodiments, a spacing between the two fragile portions 331 along the first direction may be set based on a capacity of the battery cell 300. The higher the capacity of the battery cell 300, the larger the spacing between the two fragile portions 331 along the first direction. In other embodiments, the number of the fragile portions 331 disposed along the first direction in the pressure relief region may be selected depending on the capacity or dimension of the battery cell 300.

Figure 16:
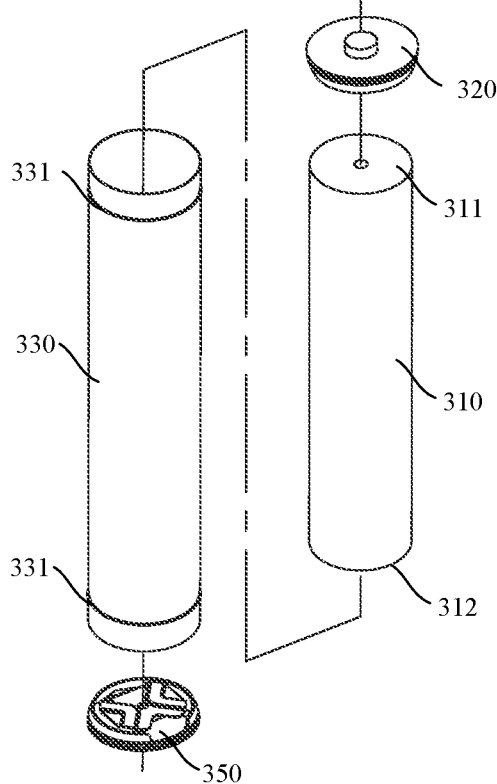
FIG. 16 is a schematic structural exploded view of a battery cell according to other various embodiments.

In some embodiments, referring to FIG. 16, FIG. 16 is a schematic structural exploded view of a battery cell according to other various embodiments.

The housing 330 further includes a second wall. The second wall and the end cap 320 are connected to two ends of the first wall respectively, the two ends being opposite to each other along the first direction. The battery cell 300 further includes an electrode assembly 310. After being wound, the electrode assembly 310 includes a first end face 321 contiguous to the end cap 320 and a second end face 322 contiguous to the second wall in the first direction.

The second wall may be another end cap 320 disposed at the other end of the housing 330, or may be a bottom wall disposed at the bottom of the housing 330.

In some embodiments, at least a part of the pressure relief region is a region located between the first end face 311 and the end cap 320 along the first direction on the first wall.

That is, a least a part of the fragile portion 331 is a region located between the first end face 311 and the end cap 320 that are opposite to each other on the first wall. The number of the fragile portions 331 may be one or more.

Generally, the gas inside the battery cell 300 is prone to concentrate at the two ends of the electrode assembly 310. Therefore, with at least a part of the pressure relief region being located between the first end face of the electrode assembly 310 and the end cap 320 on the first wall, this application can reduce the paths for releasing outward the pressure that is generated by the gas located between the end cap 320 and the electrode assembly 310. In this way, the internal pressure of the battery cell 300 can be released quickly in time when the internal pressure or temperature of the battery cell 300 reaches the threshold.

In some embodiments, at least a part of the pressure relief region is a region located between the second end face 312 and the second wall along the first direction on the first wall. That is, a least a part of the fragile portion 331 is a region located between the second end face 312 and the second wall that are opposite to each other on the first wall. The number of the fragile portions 331 may be one or more.

Generally, the gas inside the battery cell 300 is prone to concentrate at the two ends of the electrode assembly 310. Therefore, with at least a part of the pressure relief region being located between the second end face 312 of the electrode assembly 310 and the second wall on the first wall, this application can reduce the paths for releasing outward the pressure that is generated by the gas located between the second wall and the second end face 312 of the electrode assembly 310. In this way, the internal pressure of the battery cell 300 can be released quickly in time when the internal pressure or temperature of the battery cell 300 reaches the threshold.

In other embodiments, at least one fragile portion 331 is provided between the first end face 311 and the end cap 320 along the first direction on the first wall, and at least one fragile portion 331 is provided between the second end face 312 and the second wall along the first direction on the first wall. In this way, the gas at the two ends of the electrode assembly 310 can be released outward in time when the internal pressure or temperature of the battery reaches the threshold.

Understandably, in other embodiments, the pressure relief region may be a region located between the first end face 311 and the second end face 312 along the first direction on the first wall. That is, the pressure relief region is located in the middle of the housing 330.

The battery cell 300, the battery 200, and the vehicle 100 according to various embodiments have been described above. The following describes a method for manufacturing a battery cell 300 according to one embodiment. For information not detailed in the following embodiments, refer to the preceding embodiments.

One embodiment further provides a method 400 for manufacturing a battery 200. Referring to FIG. 17, FIG. 17 is a schematic flowchart of a method for manufacturing a battery according to one embodiment. The method 400 includes the following steps:

401: Provide a plurality of battery cells 300, where each battery cell 300 includes an end cap 320 and a housing 330. An opening is made at an end of the housing 330 along a first direction. The end cap 320 is configured to close the opening. The housing 330 includes a first wall extending along the first direction. A pressure relief region is provided on the first wall. The pressure relief region is configured to release pressure along a second direction when an internal pressure or temperature of the battery cell 300 reaches a threshold. The second direction intersects the first direction; and 402: Arrange the plurality of battery cells 300 along the first direction.

A plurality of battery cells 300 are arranged along the first direction. The end cap 320 is mounted at the end of the housing 330 along the first direction. The pressure relief region is provided on the first wall of the housing 330, the first wall being parallel to the first direction. When the internal pressure and temperature of the battery cell 300 reach the threshold due to overcharge or an abnormal short circuit inside the battery cell 300, the internal pressure can be released outward along the second direction that intersects the first direction. In this way, the arrangement direction of the battery cells 300 is different from the pressure release direction of the battery cells 300. Therefore, the pressure released from the pressure relief region will not cause impact or even damage to other adjacent battery cells 300, thereby improving the safety of the battery 200 in use.

One embodiment further provides a device 500 for manufacturing a battery 200. Referring to FIG. 18, FIG. 18 is a schematic structural block diagram of a device for manufacturing a battery according to one embodiment. The device 500 includes a battery cell 300 manufacturing module 501 and an assembling module 502.

The battery cell 300 manufacturing module 501 is configured to manufacture battery cells 300, where each battery cell 300 includes an end cap 320 and a housing 330. An opening is made at an end of the housing 330 along a first direction. The end cap 320 is configured to close the opening. The housing 330 includes a first wall extending along the first wall. A pressure relief region is provided on the first wall. The pressure relief region is configured to release pressure along a second direction when an internal pressure or temperature of the battery cell 300 reaches a threshold. The second direction intersects the first direction. The assembling module 502 is configured to arrange a plurality of battery cells 300 along the first direction.

Finally, it needs to be noted that the foregoing embodiments are merely intended to describe the technical solutions of this application, but not to limit this application. Although this application is described in detail with reference to the foregoing embodiments, a person of ordinary skill in the art understands that modifications may still be made to the technical solutions described in the foregoing embodiments or equivalent replacements may still be made to some technical features thereof, without making the essence of the corresponding technical solutions depart from the spirit and scope of the technical solutions of the various embodiments.

What is claimed is:

1. A battery, comprising:

a plurality of battery cells arranged along a first direction, wherein each battery cell is a cylindrical structure and comprises an end cap and a housing, an opening is made at an end of the housing along the first direction, wherein the end cap is configured to close the opening, and the housing comprises a first wall extending along the first direction; and a pressure relief region is provided on the first wall, wherein the pressure relief region is configured to release pressure along a second direction when an internal pressure or temperature of the battery cell reaches a threshold, and the second direction intersects the first direction, wherein the first wall comprises a through-hole extending along the second direction and a pressure relief sheet is mounted on the first wall and covering the through-hole;

the pressure relief region of the first wall comprises a fragile portion disposed on the pressure relief sheet, and the pressure relief region is configured to break the fragile portion to release the pressure when the internal pressure or temperature of the battery cell reaches the threshold, the fragile portion is formed on the first wall by making a first groove in the pressure relief region, and a thickness of the fragile portion is less than a thickness of a remaining part of the first wall, a bottom side of the first groove is a flat face, the thickness of the fragile portion gradually decreases from flanks to center in a width direction, the fragile portion is configured to be ruptured at a thinnest position of the fragile portion when the internal pressure or temperature of the battery cell reaches the threshold.

2. The battery according to claim 1, wherein the first groove is made on an outer surface of the first wall, and/or the first groove is made on an inner surface of the first wall.

3. The battery according to claim 1, wherein the first wall further comprises a body portion, and the body portion and the fragile portion are integrally formed.

4. The battery according to claim 1, wherein the first groove extends along the first direction, and a ratio of a dimension of the first groove in the first direction to a dimension of the first wall in the first direction is greater than ⅓.

5. A battery comprising:

a plurality of battery cells arranged along a first direction, wherein each battery cell is a cylindrical structure and comprises an end cap and a housing, an opening is made at an end of the housing along the first direction, wherein the end cap is configured to close the opening, and the housing comprises a first wall extending along the first direction; and a pressure relief region is provided on the first wall, wherein the pressure relief region is configured to release pressure along a second direction when an internal pressure or temperature of the battery cell reaches a threshold, and the second direction intersects the first direction, a fragile portion is formed on the first wall by making a first groove in the pressure relief region, and a thickness of the fragile portion is less than a thickness of a remaining part of the first wall, the first groove is an annular structure, the housing further comprises a second wall, and the second wall and the end cap are connected to two ends of the first wall respectively, the two ends of the first wall being opposite to each other along the first direction, the battery cell further comprises an electrode assembly, and, after being wound, the electrode assembly comprises a first end face contiguous to the end cap and a second end face contiguous to the second wall in the first direction, at least a part of the pressure relief region is located either between the first end face and the end cap along the first direction or between the second end face and the second wall along the first direction on the first wall, the first groove comprises a first part and a second part that are in communication with each other, the fragile portion comprises a first fragile portion formed by disposing the first part and a second fragile portion formed by disposing the second part, wherein a thickness of the first fragile portion is less than a thickness of the second fragile portion, and the pressure relief region is configured to break the first fragile portion and avoid breaking at least a part of the second fragile portion when the internal pressure or temperature of the battery cell reaches the threshold, a central angle corresponding to an arc length of the first part is at least 180° and a central angle corresponding to an arc length of the second part is no more than 180°, a sum of the arc length of the first part and the arc length of the second part accounts for a total length of the first groove.

6. The battery according to claim 5, wherein the first groove is disposed around a central axis of the battery cell, the central axis being parallel to the first direction.

7. The battery according to claim 6, wherein the first wall comprises two fragile portions spaced apart along the first direction in the pressure relief region.

8. The battery according to claim 7, wherein a spacing between two fragile portions along the first direction is set based on a capacity of the battery cell.

9. The battery according to claim 1, wherein the housing further comprises a second wall, and the second wall and the end cap are connected to two ends of the first wall respectively, the two ends being opposite to each other along the first direction, the battery cell further comprises an electrode assembly, and, after being wound, the electrode assembly comprises a first end face contiguous to the end cap and a second end face contiguous to the second wall in the first direction.

10. The battery according to claim 9, wherein at least a part of the pressure relief region is a region located between the first end face and the end cap along the first direction on the first wall.

11. The battery according to claim 9, wherein at least a part of the pressure relief region is a region located between the second end face and the second wall along the first direction on the first wall.

12. An electrical device, wherein the electrical device comprises a battery, the battery is configured to provide electrical energy, and the battery comprises:

a plurality of battery cells arranged along a first direction, wherein each battery cell is a cylindrical structure and comprises an end cap and a housing, an opening is made at an end of the housing along the first direction, the end cap is configured to close the opening, and the housing comprises a first wall extending along the first direction; and a pressure relief region is provided on the first wall, the pressure relief region is configured to release pressure along a second direction when an internal pressure or temperature of the battery cell reaches a threshold, and the second direction intersects the first direction, wherein the first wall comprises a through-hole extending along the second direction and a pressure relief sheet is mounted on the first wall and covering the through-hole;

the pressure relief region of the first wall comprises a fragile portion disposed on the pressure relief sheet, and the pressure relief region is configured to break the fragile portion to release the pressure when the internal pressure or temperature of the battery cell reaches the threshold, the fragile portion is formed on the first wall by making a first groove in the pressure relief region, and a thickness of the fragile portion is less than a thickness of a remaining part of the first wall, a bottom side of the first groove is a flat face, the thickness of the fragile portion gradually decreases from flanks to center in a width direction, the fragile portion is configured to be ruptured at a thinnest position of the fragile portion when the internal pressure or temperature of the battery cell reaches the threshold.

13. The battery according to claim 2, wherein the first groove is made on both the outer surface and the inner surface of the first wall.

14. The battery according to claim 5, wherein the first wall comprises a through-hole extending along the second direction and a pressure relief sheet is mounted on the first wall and covering the through-hole, the pressure relief region of the first wall comprises a fragile portion disposed on the pressure relief sheet, and the pressure relief region is configured to break the fragile portion to release the pressure when the internal pressure or temperature of the battery cell reaches the threshold.

* * * * *